US007041904B2

(12) United States Patent
Da Silva

(10) Patent No.: US 7,041,904 B2
(45) Date of Patent: May 9, 2006

(54) CABLE CLAMP AND TERMINAL BLOCK EQUIPPED WITH SAME

(75) Inventor: Frank Da Silva, Saint Savin (FR)

(73) Assignee: ABB Entrelec, Villeurbanne (FR)

( * ) Notice: Subject to any disclaimer, the term of this patent is extended or adjusted under 35 U.S.C. 154(b) by 0 days.

(21) Appl. No.: 10/974,847

(22) Filed: Oct. 28, 2004

(65) Prior Publication Data

US 2005/0155783 A1 Jul. 21, 2005

(30) Foreign Application Priority Data

Nov. 17, 2003 (FR) .................................. 03 13408

(51) Int. Cl.
*H02G 3/18* (2006.01)

(52) U.S. Cl. .................. 174/65 R; 174/135; 174/68.1; 174/191; 248/68.1; 248/62

(58) Field of Classification Search ............... 174/68.1, 174/65 R, 135, 40 CC, 191, 197, 177; 248/49, 248/74.4, 68.1, 69, 71, 74.1, 63, 62; 138/106, 138/108, 162; 439/709, 712, 610, 468, 811; 24/271

See application file for complete search history.

(56) References Cited

U.S. PATENT DOCUMENTS 2,532,427 A * 12/1950 Smith ........................ 174/65 R
2,550,001 A * 4/1951 Button ....................... 248/74.4
2,938,692 A * 5/1960 Bosworth et al. .......... 248/68.1
2,980,378 A * 4/1961 Barron ......................... 248/63
3,617,612 A * 11/1971 Patton ....................... 174/65 R
4,037,810 A * 7/1977 Pate ........................... 248/68.1
4,118,838 A * 10/1978 Schiefer et al. ............ 248/68.1
4,405,828 A * 9/1983 Shook ......................... 174/177
4,516,822 A * 5/1985 Wolfel ......................... 439/468
4,775,122 A * 10/1988 McClymont .............. 174/65 R
5,004,437 A * 4/1991 Walter et al. ............... 439/811
5,713,766 A * 2/1998 Davies et al. ............... 439/709
6,011,218 A * 1/2000 Burek et al. ................ 174/135
6,126,122 A * 10/2000 Ismert ........................ 248/74.4
6,516,498 B1 * 2/2003 LaCoy et al. ................. 24/271
6,641,429 B1 11/2003 Wu
6,657,125 B1 * 12/2003 Thompson et al. ....... 174/65 R

FOREIGN PATENT DOCUMENTS

DE 101 46 119 C1 12/2002
EP 0 653 811 A1 5/1995
FR 2 698 492 A1 5/1994

* cited by examiner

*Primary Examiner*—Angel R. Estrada
(74) *Attorney, Agent, or Firm*—Oliff & Berridge, PLC

(57) ABSTRACT

A cable clamp device for retaining an electrical cable in relation to a carrier outside the device may include a stirrup comprising two legs connected by a curved base, a conducting stop which is mounted between the two legs and which includes a surface that establishes contact with the electrical cable, and a drive mechanism that effects a movement of the stirrup in relation to the conducting stop to move the base and the stop alternatively toward and away from one another. The contact surface of the stop may be concave in shape, the concavity of which may be turned in a direction of the base of the stirrup.

8 Claims, 2 Drawing Sheets

CABLE CLAMP AND TERMINAL BLOCK EQUIPPED WITH SAME

BACKGROUND OF THE INVENTION

The present invention relates to a cable clamp device for retaining an electrical cable in relation to a carrier outside the device.

The carrier outside the device is formed in particular by an electrical terminal block which is intended to enable the electrical connection of the end of an electrically conducting cable using the "screw-to-screw" technique.

DESCRIPTION OF THE PRIOR ART

Familiar cable clamp devices are of the type comprising:

a stirrup comprising two legs which are more or less parallel with one another, and a curved base connecting said two legs, the electrical cable being intended to be contained in the base of the stirrup, an electrically conducting stop which is mounted between the two legs and which comprises a contact surface intended to abut against the electrical cable, and drive means which effect the movement of the stirrup in relation to the conducting stop to move the base and the stop alternatively towards and away from one another, said drive means being intended to enable the selective clamping of the electrical cable between the base of the stirrup and the contact surface of the conducting stop.

Even if such devices are entirely satisfactory in terms of the actual electrical connection of the conducting cable, these devices nevertheless have the disadvantage that they do not hold the cable firmly in place, particularly if the diameter of the cable to be connected is large compared with the dimensions of the conducting stop.

SUMMARY OF THE INVENTION

The object of the present invention is to eliminate the aforementioned disadvantages by providing a cable clamp device in which the cable is maintained more firmly in position, but without increasing the number of parts which comprise the device.

To this end, according to the present invention, the cable clamp device of the aforementioned type is essentially characterized in that the contact surface of the stop is concave in shape, the concavity of which is turned in the direction of the base of the stirrup.

Thus, thanks to these measures, the contact surface of the conducting stop is intended to abut against the conducting cable at a plurality of points, not at a single point only, as in the prior art.

The contact surface preferably comprises an essentially flat central core and two sloping sides which extend from the central core and diverge from one another in the direction of the base of the stirrup.

The stirrup is advantageously implemented in a band of flat material with a predetermined width.

The width of the sloping sides is preferably less than the width of the band of the stirrup.

In a preferred implementation, the base of the stirrup comprises two openings respectively located perpendicular to the sloping sides, into which said sloping sides penetrate at least partially. Thus, the device also enables reduced-diameter cables to be firmly clamped.

Advantageously, the projection of the openings on a plane perpendicular to the legs of the stirrup and in a direction essentially parallel to the legs is essentially rectangular in shape, its length being less than the width of the band of the stirrup.

The electrically conducting stop again preferably comprises a connecting bar of an electrical terminal block.

In a preferred manner, the external carrier is formed by a body of insulating material which makes up the electrical terminal block.

The object of the present invention is furthermore an electrical terminal block comprising a body of insulating material which contains electrical connection openings, at least one cable clamp device according to any one of the aforementioned characteristics being inserted in at least one of the electrical connection openings.

In any event, the present invention will be readily understood with the aid of the description which follows, provided with reference to the attached schematic drawing, and representing, by way of non-limiting examples, two embodiments of the cable clamp device according to the present invention.

DESCRIPTION OF THE PREFERRED EMBODIMENTS

Figure 1:
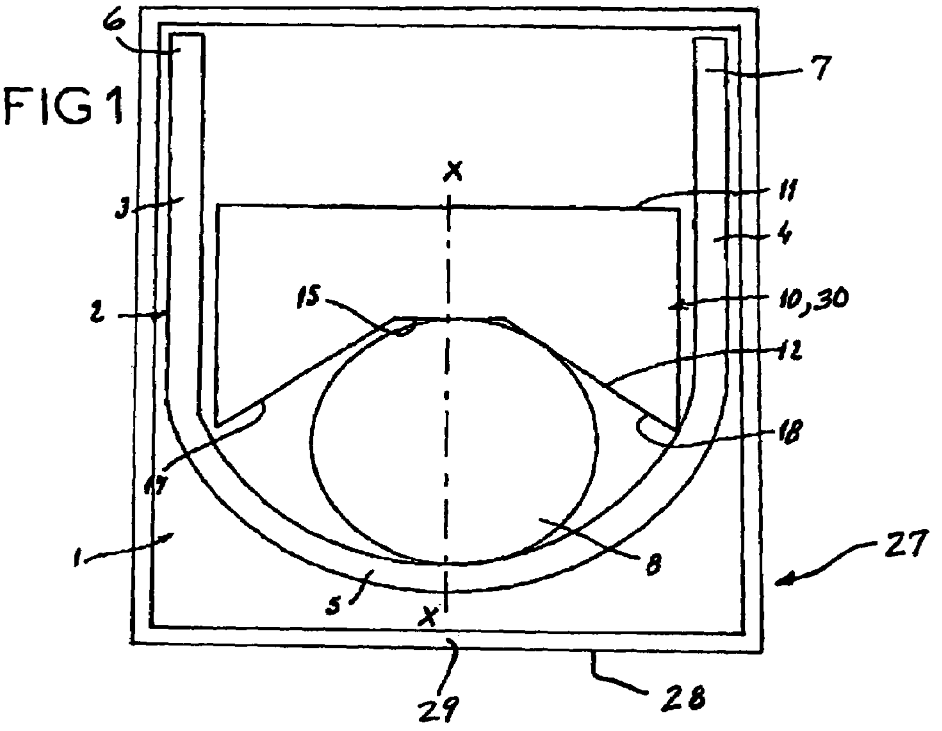
FIG. 1 is a front view of a cable clamp device according to a first embodiment of the present invention, wherein a cable with a given diameter is immobilized.

The cable clamp device 1 shown, according to a first embodiment shown in FIG. 1, is adapted to retain an electrical cable in position in order to establish an electrical connection with another conducting element or carrier 27. This device is intended in particular to be installed in an electrical terminal block 28 whose insulating body 29 contains electrical connection elements such as a connecting bar 30. The function of this bar is, for example, to connect a plurality of electrically conducting elements to the same potential. A terminal block of this type is well known in the prior art and is not described or shown in detail here.

The cable clamp device 1 comprises, in a manner known per se, a stirrup 2 which contains an electrically conducting stop 10. This stop 10 takes the shape, for example, of a section of the aforementioned connecting bar.

The stirrup 2 is formed from two legs 3 and 4 which extend more or less parallel with one another in a direction X—X, and a curved base 5 which connects the two legs 3, 4. Unlike the base 5, these two legs 3 and 4 have free ends and 7, respectively.

It will therefore be understood that the stirrup 2 is generally U-shaped. It is formed in a band of flat material with a predetermined width. The length of the legs 3 and 4 is greater than the width of the stirrup 2.

The electrically conducting stop 10 is located between the two legs 3 and 4 of the stirrup. This stop 10 is generally parallelepiped-shaped and has a first surface 11 which is turned towards the free ends and 7 of the legs 3, 4, and a second opposing surface 12 turned towards the curved base 5 of the stirrup 2. The second surface 12 is a surface which establishes electrical contact with the conducting cable 8 to establish an electrical connection with this cable when the stop is clamped against it in the base 5 of the stirrup.

To this end, the cable clamp device 1 normally comprises drive means (not shown) which produce the relative movement of the stirrup 2 in relation to the stop 10 in order to either move the base 5 closer in the direction of the stop and thereby clamp the cable in the base, or, conversely, to move the base 5 away from the stop 10, i.e. to cause the free ends 7 of the legs 3, 4 to move towards the stop 10 and thereby unclamp the cable 8.

These drive means comprise, for example, means with a screw nut which, through screwing of the nut, cause the movement of the stirrup 2 in the cable-clamping direction. The stirrup performs a reciprocating translational movement in the direction parallel to the axis X—X, perpendicular to the plane defined by the first surface 11 of the stop 10.

According to a first essential characteristic of the invention, the contact surface 12 of the stop 10 is concave in shape, the concavity of which is turned towards the base 5 of the stirrup 2. Thus, the cable 8 is brought into contact with this surface 12 at a plurality of points, thereby improving the retention of this cable.

The contact surface 12 preferably takes the shape of a channel which has a central core 15 which is essentially flat and parallel with the first surface 11, and two sloping sides 17 and 18 which extend from this core and diverge from one another in the direction of the base 5 of the stirrup. Thus, when clamping, the cable 8 may abut against one or both sloping sides and/or the central core according to the diameter of this cable.

The width of the sloping sides 17 and 18 is less than the width of the stirrup 2.

The cable 8 shown in FIG. 1 is the cable with the smallest diameter which the device 1 can clamp, since the ends of the sloping sides 17 and 18 abut against the base 5 of the stirrup 2. Conversely, the cable with the largest diameter which can be immobilized in the stirrup is the cable which has a diameter close to the value of the clearance between the two legs 3 and 4 of this stirrup (such as the cable 24 shown in FIG. 2).

Figure 2:
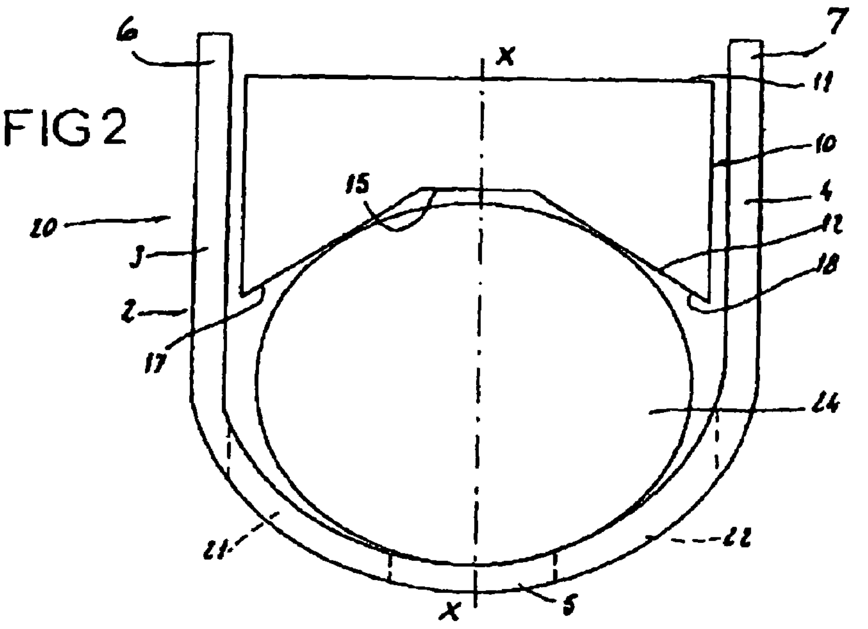
FIG. 2 is a view analogous to FIG. 1 of a second embodiment of the device according to the present invention, wherein a cable with a larger diameter is immobilized.
Figure 3:
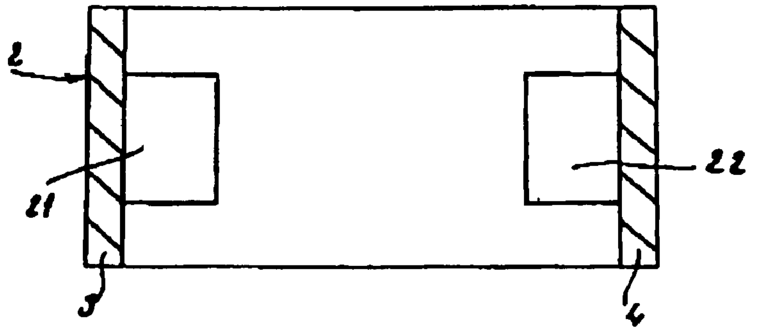
FIG. 3 is a view from above of the stirrup alone, with the legs removed.
Figure 4:
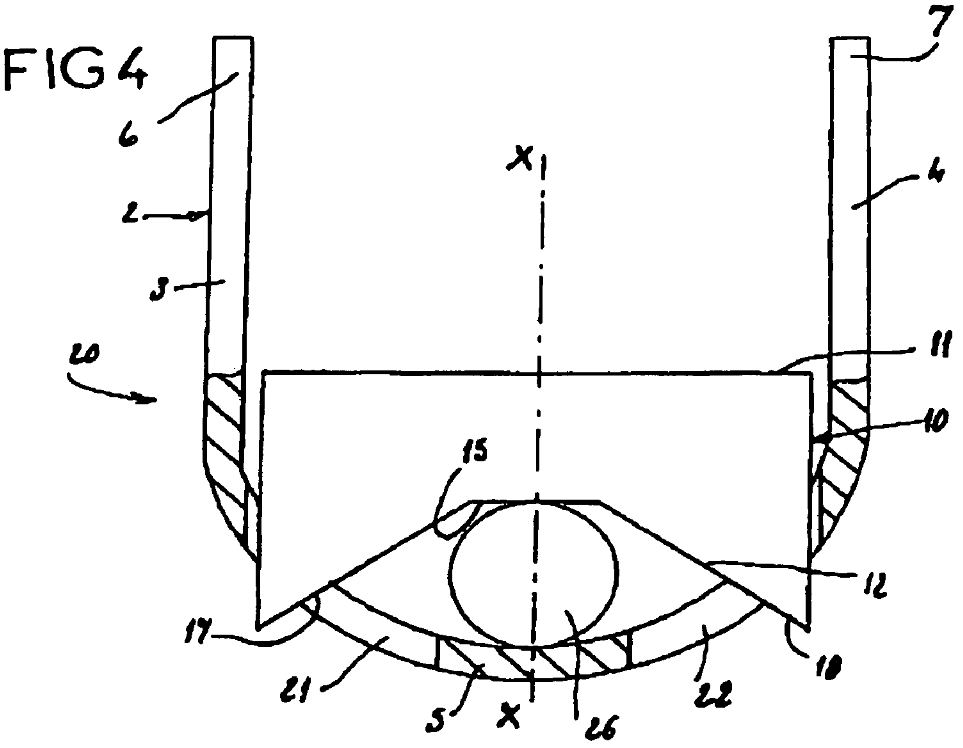
FIG. 4 is a view analogous to FIG. 2, wherein a reduced-diameter cable is immobilized in the cable clamp.

On the other hand, to immobilize a cable with a reduced diameter compared with the cable 8, the cable clamp device 20 according to a second embodiment shown in FIGS. 2 to 4 is used.

The constituent parts similar or identical to the first embodiment shown in FIG. 1 and to the second embodiment are identified by the same reference numbers.

The cable clamp device 20 differs from the device 1 by the fact that two openings 21 and 22 are disposed in the base 5 of the stirrup 2 and are respectively located to the sloping sides 17 and 18 of the contact surface 12 of the stop 10.

The dimensions of the openings 21 and 22 are adapted so that the sloping sides 17 and 18 penetrate at least partially through these openings when the base 5 is moved towards the stop 10 with the contact surface 12 within a predetermined distance of the base 5 (FIG. 4).

Thus, the projection of the openings 21 and 22 in a plane perpendicular to the legs 3, 4 (or parallel to the first surface 11 of the stop) and in a direction essentially parallel to the axis X—X is essentially rectangular-shaped. The length of this rectangle is less than the width of the stirrup 2, as is most clearly evident in FIG. 3.

A reduced-diameter cable 26 is retained in the base 5 of the stirrup (FIG. 4) and the ends of the sloping sides 17 and 18 cross the openings 21 and 22 to protrude outside the stirrup 2.

In a terminal block equipped with a cable clamp device of this type, it is therefore possible to immobilize cables not only firmly, but also with a broad range of diameters, considerably less than the dimensions of the space defined by the position of the stirrup (FIG. 1), in which the ends of the sloping sides are adjacent to the base of this stirrup.

Obviously, the invention is not limited to the preferred embodiments described above as non-limiting examples; on the contrary, it includes all embodiment variants as defined by the claims set out below.

What is claimed is:

1. A cable clamp device for retaining an electrical cable in relation to a carrier outside the device, said device comprising:

a stirrup comprising two legs which are more or less parallel with one another, and a curved base connecting said two legs, the electrical cable being intended to be contained in the base of the stirrup, an electrically conducting stop which is mounted between the two legs and which comprises a contact surface intended to abut against the electrical cable, drive means which effect the movement of the stirrup in relation to the conducting stop to move the base and the stop alternatively towards and away from one another, said drive means being intended to enable the selective clamping of the electrical cable between the base of the stirrup and the contact surface of the conducting stop, wherein the contact surface of the stop is concave in shape, a concavity of which is turned in a direction of the base of the stirrup, the contact surface comprises an essentially flat central core and two sloping sides which extend from the central core and diverge from one another in the direction of the base of the stirrup, and the base of the stirrup comprises two openings respectively located to the sloping sides and into which said sloping sides penetrate at least partially when the contact surface is located within a predetermined distance of the base of the stirrup.

2. The cable clamp device as claimed in claim 1, wherein the stirrup is implemented in a band of flat material with a predetermined width.

3. The cable clamp device as claimed in claim 2, wherein a width of the sloping sides is less than the predetermined width of the band of the stirrup.

4. The cable clamp device as claimed in claim 3, wherein a projection of the openings on a plane perpendicular to the legs of the stirrup and in a direction essentially parallel to the legs is essentially rectangular in shape, the length thereof being less than the width of the band of the stirrup.

5. The cable clamp device as claimed in claim 1, wherein the electrically conducting stop comprises a connecting bar of an electrical terminal block.

6. The cable clamp device as claimed in claim 5, further comprising a carrier formed by a body of insulating material which makes up the electrical terminal block.

7. An electrical terminal block comprising a body of insulating material which contains electrical connection openings and at least one cable clamp device as claimed in claim 1 inserted in at least one of the electrical connection openings.

8. The cable clamp device as claimed in claim 1, the base of the stirrup comprises two openings respectively located to the sloping sides and through which said sloping sides penetrate at least partially when the contact surface is located within a predetermined distance of the base of the stirrup.

* * * * *